(12) United States Patent
Deshayes et al.

(10) Patent No.: US 12,512,668 B2
(45) Date of Patent: Dec. 30, 2025

(54) GENERIC HIGH-VOLTAGE DC ELECTRICAL DISTRIBUTION PANEL

(71) Applicant: SAFRAN ELECTRICAL & POWER, Blagnac (FR)

(72) Inventors: Olivier Deshayes, Blagnac (FR); Jérôme Valire, Blagnac (FR); Arnaud Badault, Blagnac (FR); Cecil Beltan, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 1 day.

(21) Appl. No.: 18/838,294

(22) PCT Filed: Feb. 6, 2023

(86) PCT No.: PCT/FR2023/050154
§ 371 (c)(1),
(2) Date: Aug. 14, 2024

(87) PCT Pub. No.: WO2023/156722
PCT Pub. Date: Aug. 24, 2023

(65) Prior Publication Data
US 2025/0149883 A1    May 8, 2025

(30) Foreign Application Priority Data
Feb. 17, 2022   (FR) ...................... 2201421

(51) Int. Cl.
*H02J 1/06* (2006.01)
*H02J 7/00* (2006.01)
*H02J 7/34* (2006.01)

(52) U.S. Cl.
CPC .............. *H02J 1/06* (2013.01); *H02J 7/0063* (2013.01); *H02J 7/345* (2013.01); *H02J 2310/44* (2020.01)

(58) Field of Classification Search
CPC .. H02J 1/06; H02J 7/0063; H02J 7/345; H02J 2310/44
See application file for complete search history.

(56) References Cited

U.S. PATENT DOCUMENTS

2015/0069829 A1   3/2015   Dulle et al.
2018/0006413 A1*  1/2018   Pal ...................... H01R 13/187

FOREIGN PATENT DOCUMENTS

EP   2871922 A2   5/2015

OTHER PUBLICATIONS

Search Report and Written Opinion issued in International Application PCT/FR2023/050154, mailed May 12, 2023.

* cited by examiner

*Primary Examiner* — Carlos Amaya
(74) *Attorney, Agent, or Firm* — Bookoff McAndrews, PLLC

(57) ABSTRACT

A high-voltage DC electrical distribution plate with two integrated electromechanical power contactors. Chambers of fixed and movable contact terminals of the two contactors are disposed on a first of the major surfaces of the plate, while on the second major surface of the plate are disposed complementary assemblies of the two contactors, each complementary assembly including a motor intended to activate the contact terminals of the contactor in question. The other components disposed on the second major surface of the plate leave a free space constituting an area of attachment of the complementary assemblies of the two contactors, this area being dimensioned to allow the arrangement of the complementary assemblies of the contactors in two orthogonal orientations allowing the motors to activate contact terminals of different sub-assemblies of the contact chambers and thus to make the parallel or series configurations of the contactors.

7 Claims, 6 Drawing Sheets

[Fig. 1]
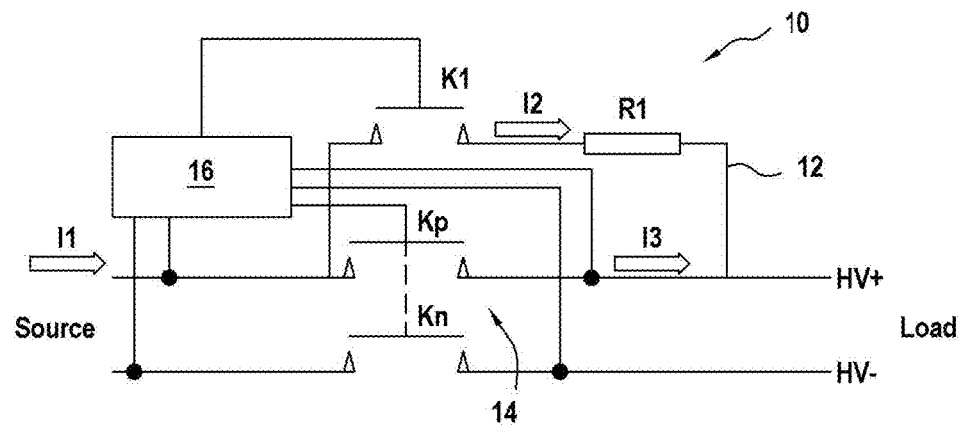
PRIOR ART
[Fig. 2]
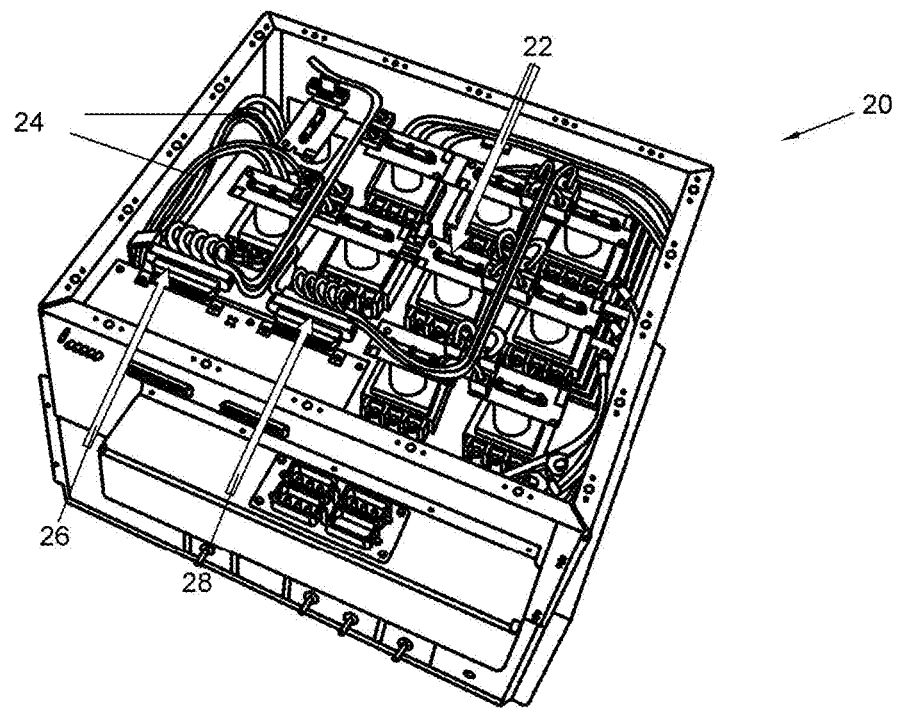
PRIOR ART

[Fig. 3]
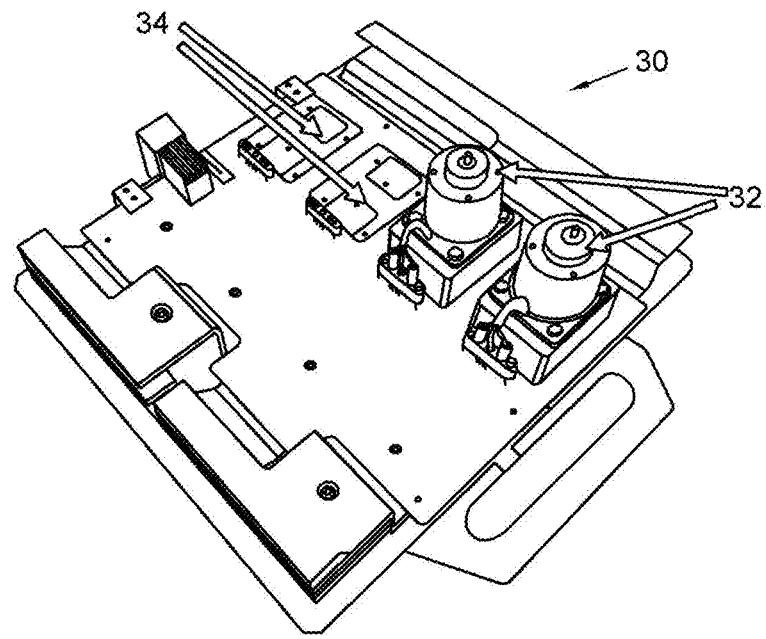
PRIOR ART
[Fig. 4]
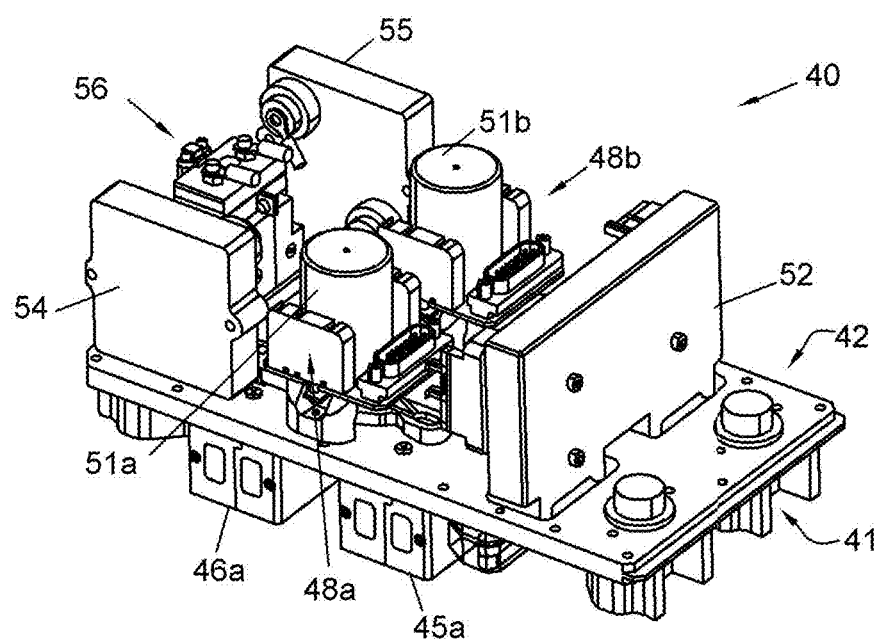

[Fig. 5]
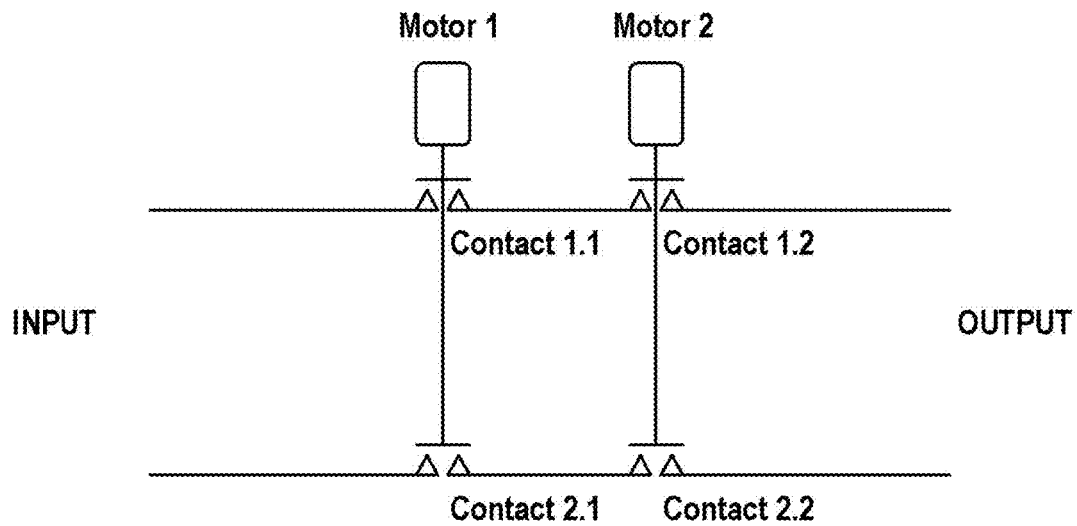
[Fig. 6]
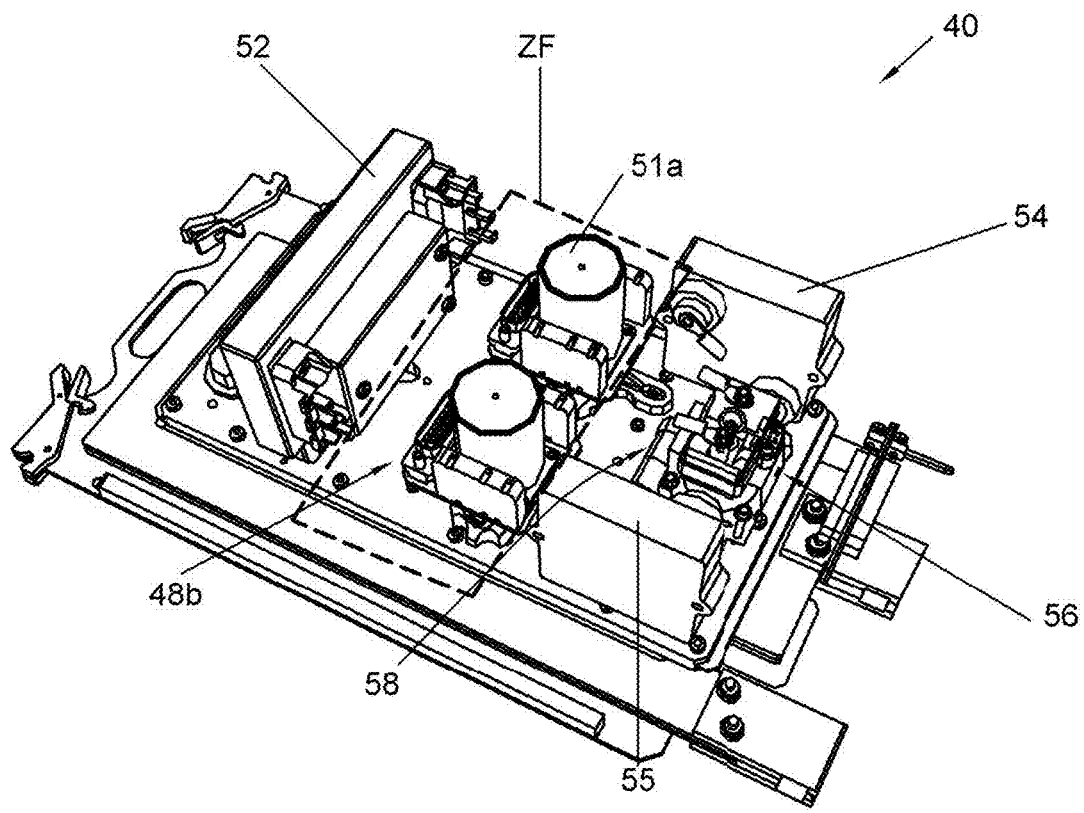

[Fig. 7]
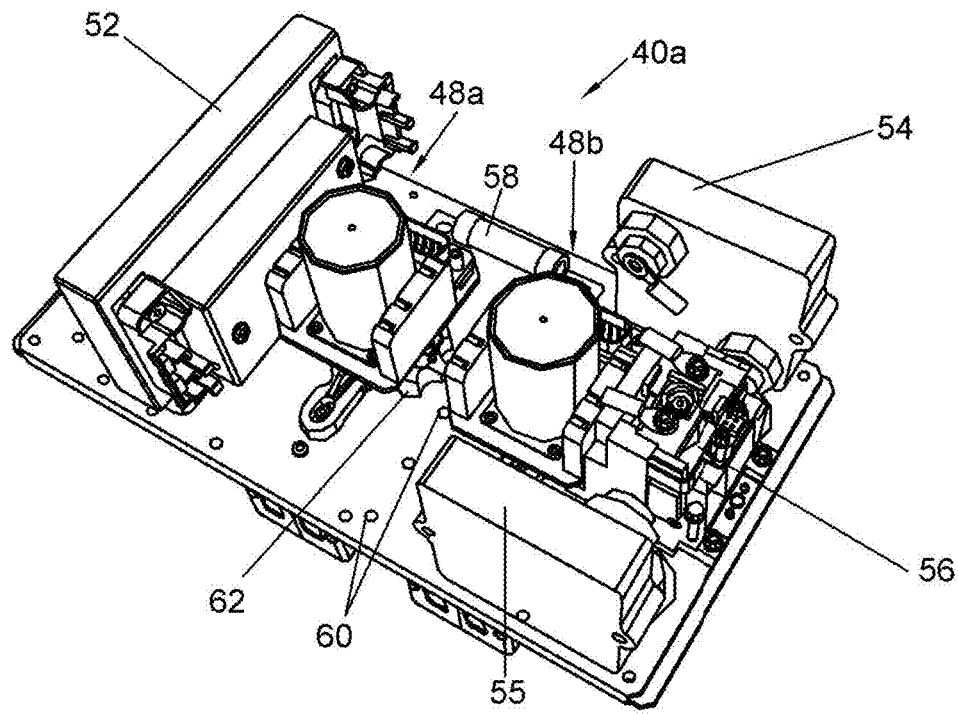
[Fig. 8]
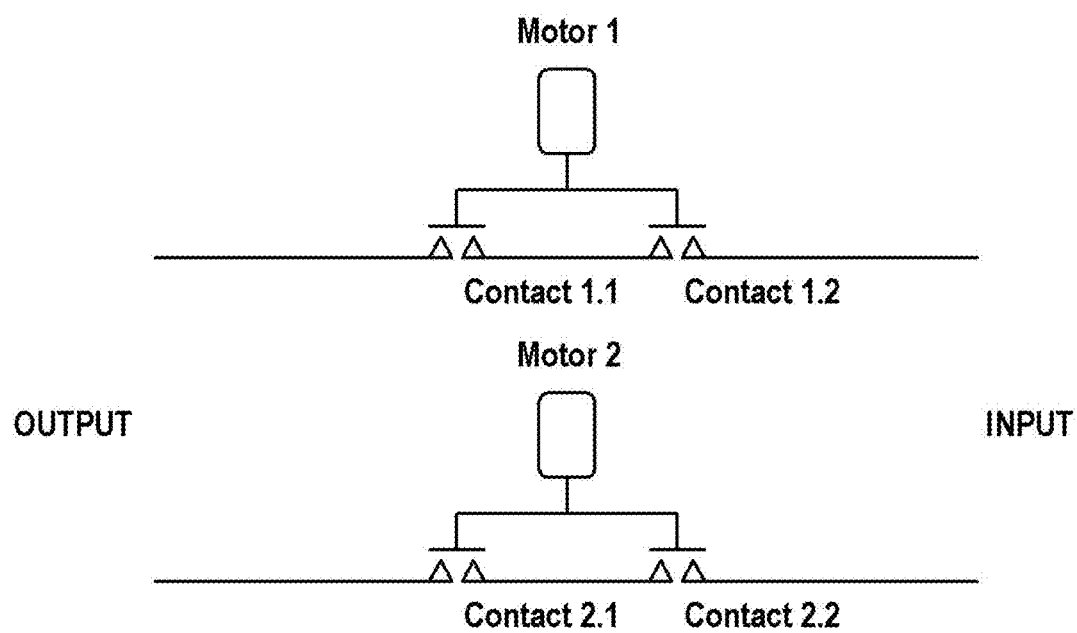

[Fig. 9]
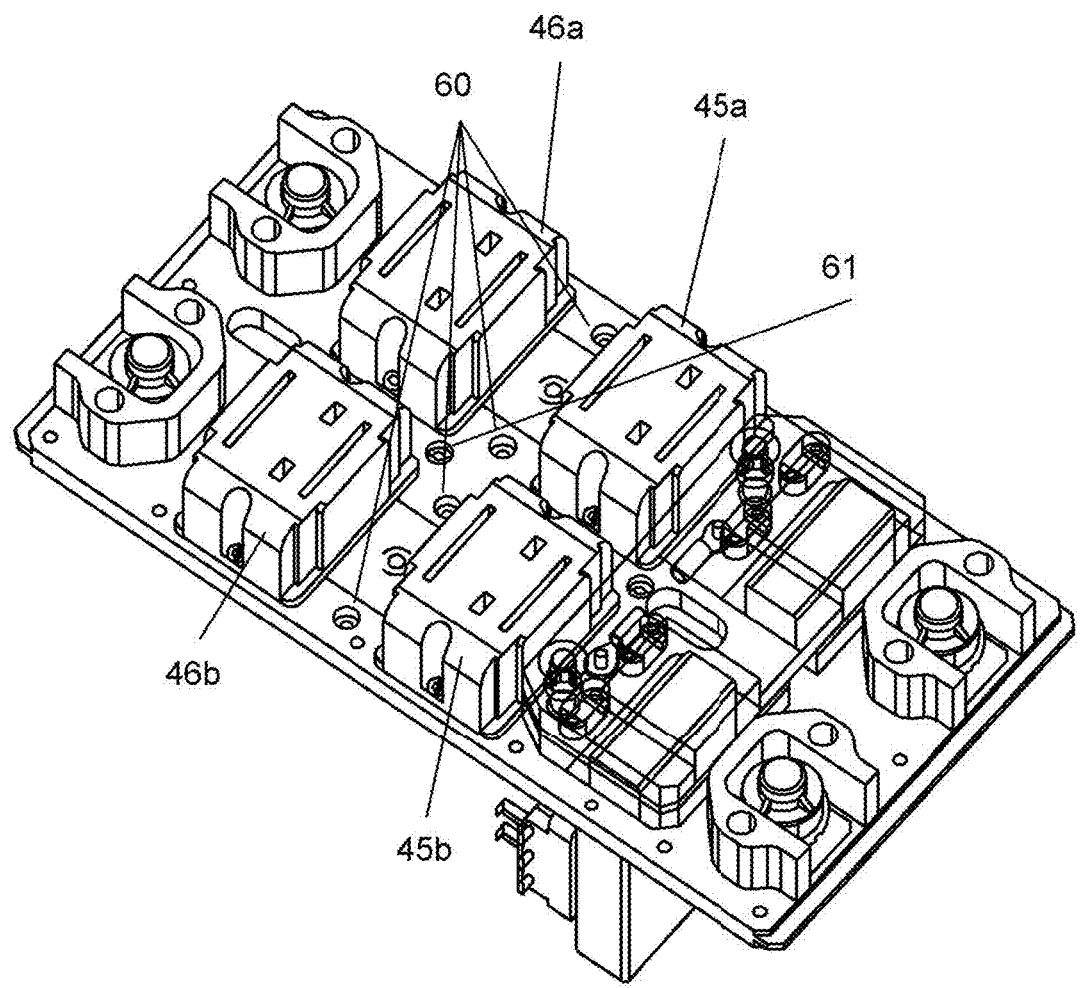

[Fig. 10]
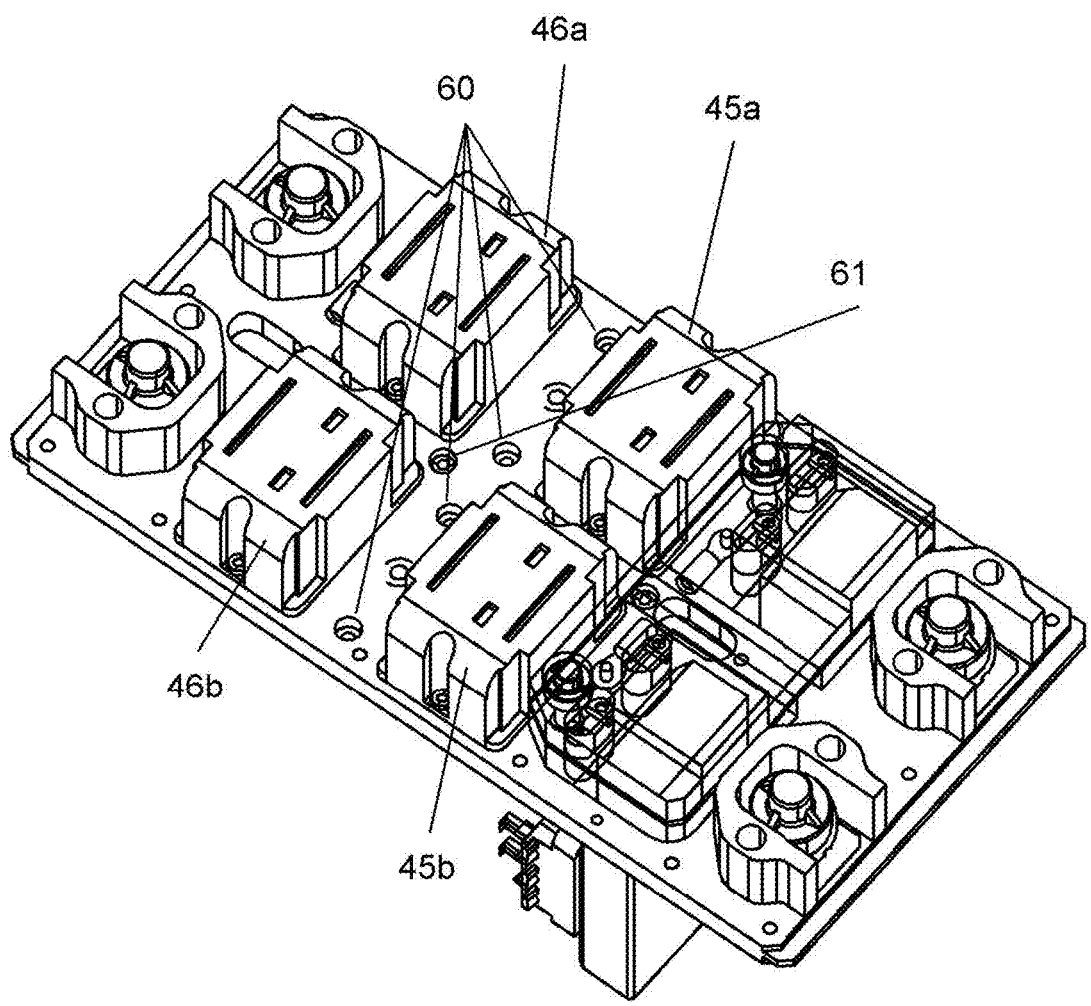

GENERIC HIGH-VOLTAGE DC ELECTRICAL DISTRIBUTION PANEL

CROSS-REFERENCE TO RELATED APPLICATIONS

This is a National Stage Application under 35 U.S.C. § 371 of International Application No. PCT/FR2023/050154, filed Feb. 6, 2023, now published as WO 2023/156722 A1, which claims priority to French Patent Application No. 2201421, filed on Feb. 17, 2022, the entireties of which are incorporated herein by reference.

TECHNICAL FIELD

This invention relates to the field of electrical distribution of power, particularly in an aircraft, and more specifically relates to a generic high-voltage DC electrical power distribution panel.

PRIOR ART

To distribute power in an electrical power distribution network of an aircraft, one generally uses electrical distribution units equipped with electromechanical power contactors, Kn and Kp, intended to switch the power lines HV+ and HV− between a source and a load. The power contactors, Kn and Kp, are used to switch the power on the one hand and to isolate the line on the other.

In general, in power distribution, the contactors Kn and Kp are combined with other components such as a precharging circuit. The precharging circuit is included on the power line HV+ with a contactor K1 and a power resistance R1. A current sensor moreover makes it possible to measure the current in the lines HV+ and HV− in order to control the contactors Kp, Kn and K1 and ensure the protection of the distribution line. Control electronics activate the motors being used to drive the contactors. The assembly constitutes a BPMU (Bus Power Management Unit) which can for example be used between a high-voltage battery and an electric motor in the case of all-electric propulsion of a small aircraft. This BPMU is an example of a high-voltage cut-off device with a precharging resistance.

FIG. 1 shows the general block diagram of an example 10 of such a BPMU of the prior art.

As can be seen on FIG. 1, the BPMU 10 intended to be contained in the power distribution unit includes a branch (precharging branch 12) parallel to the main switching element 14 Kp/Kn disposed between the electrical power source and the high and low voltage lines HV+ and HV− powering the load. This Kp/Kn pair of electromechanical contactors provides galvanic isolation in the open state and a very low impedance (a hundred mV on nominal current) in the closed state. These electromechanical contactors are conventionally controlled from a control module 16 according to voltage and/or current information measured upstream and downstream of these contactors.

The elements of the parallel precharging branch 12, a contactor K1 and a limiting resistance R1, have an impedance defined to have a current 12 determined by the source voltage/R1 corresponding to the precharging current of the load (typically of a few tens of Amperes). The contactor K1 is also of electromechanical type to provide galvanic isolation in the open state and also controlled by the control module 16.

The physical embodiment of electrical power distribution units is based on a box and/or a plate. The specific arrangement of the different components of the BPMU depends on the application and, therefore, the power distribution unit must be made "to measure" each time, according to the application. Only the basic components (switches, motors, resistances, and others) are generic products and constitute the building blocks re-used for the applications. To summarize, distribution units are designed to adapt to requirements based on mechanically-integrated discrete elements.

The prior art makes provision for various attempts to promote a modular approach based on the use of standard building blocks including re-usable sub-assemblies.

FIG. 2 shows a photograph of an example of a generic module 20 with a pattern of contactors for a power distribution array according to a first approach. This generic module 20, defined a priori, makes it possible to make the required power interconnections according to the scenario of application.

The module 20 shown on FIG. 2 is a power distribution box incorporating switches 22 arranged in an array, and measuring elements (not visible on the photograph). A large number of cables 24 is needed to connect the switching elements 22 and the measuring elements to two terminals 26 28 which are also incorporated into the box. Given that provision must be made for different applications, there are superfluous components and the mass and volume of the device are significant.

FIG. 3 shows a photograph of an example of a generic module 30 according to a second approach, which has electromechanical elements integrated into a plate itself.

The module 30 shown on FIG. 3 is a plate intended for use in a power distribution unit and, according to the example shown, includes two contactors 32 mechanically integrated with the plate to make it an integral part. In other words, the contactors 32 are not removable. Locations 34 are provided on the plate for other contactors but, again, in previously defined and fixed positions.

The modular or integration solutions for which provision has been made until now have the drawback of defining "a priori" configurations for which the use case must adapt to meet the specific power distribution requirement. They are therefore only generic to a limited extent.

SUMMARY OF THE INVENTION

This invention thus has the main objective of making provision for a generic electrical power distribution plate, modular, with integrated contactors on the power plate, configured to allow for adaptation to the required use of distribution and precharging in a high-voltage DC network.

These aims are achieved by a high-voltage DC electrical distribution plate, having two opposing major surfaces, the plate having two integrated electromechanical power contactors, characterized in that:
  on a first of the major surfaces of the plate are disposed chambers of fixed and movable contact terminals of the two electromechanical contactors, while on the second major surface of the plate are disposed complementary assemblies of the two contactors, each complementary contactor assembly including a motor intended to activate the contact terminals of the contactor in question,
  and in that other components disposed on the second major surface of the plate are arranged in such a way as to leave a free space constituting an area of attachment of the complementary assemblies of the two contactors, the attachment area being dimensioned to allow the arrangement of the complementary assemblies of the contactors in two orthogonal orientations allowing the motors to activate contact terminals of different subassemblies of the contact chambers and thus to make parallel or series configurations of the contactors.

The proposed invention makes provision for a modular generic plate with contactors integrated onto a power plate which allow two arrangement configurations to allow adaptation to the required use of distribution and precharging in a high-voltage DC network. The high level of integration of the components on the power plate makes it possible to optimize the mass and volume of the function. The modularity of the solution also makes it possible to meet different requirements owing to the proposed configurations which allow it to be made generic.

Advantageously, the center-to-center distances of the chambers of the contactors and the center-to-center distances of the complementary assemblies of the contactors are dimensioned to align the contacts of the two contactors with the corresponding motors of the complementary assemblies of the contactors in the first and the second orientation of the complementary assemblies of the contactors.

In a preferred embodiment, on the second major surface of the plate, attachment points are provided, points of a number and positions chosen to ensure the attachment of the complementary assemblies of the contactors to the plate, by means of the interaction between these attachment points on the plate and complementary attachment elements provided on the complementary assemblies of the contactors, whether the complementary assemblies of the contactors are oriented in the first configuration or in the second configuration. This arrangement of the attachment points ensures the robust integration of the contactors on the plate while also observing the configurable nature of the assembly.

In a preferred embodiment, the aforementioned high-voltage electrical distribution plate includes a precharging function. This configuration makes it possible to obtain a very large reduction in terms of mass and volume by comparison with the previously-proposed devices including a precharging function.

The invention also relates to a high-voltage DC electrical distribution unit equipped with the aforementioned high-voltage distribution plate. In a preferred embodiment, the aforementioned high-voltage electrical distribution unit is mounted between a storage unit and a high-voltage DC (HVDC) bus of an aircraft. Advantageously, the storage unit can be a battery or a supercapacitor.

The invention also relates to an electrical power distribution network of an aircraft including an electrical power distribution unit as mentioned above.

BRIEF DESCRIPTION OF THE FIGURES

Other features and advantages of this invention will become apparent from the description given below, with reference to the appended drawings which illustrate an exemplary embodiment thereof without any limitation and on which:

FIG. 1 shows the general block diagram of an example of an electrical distribution unit equipped with electromechanical power contactors of the prior art, FIG. 2 shows a photograph of a generic module with a pattern of contactors of the prior art, FIG. 3 shows a photograph of a plate of the prior art with integrated non-removable contactors, FIG. 4 shows a high-voltage DC distribution plate according to a preferred embodiment of the invention, with complementary power contactor assemblies arranged in a first orientation, FIG. 5 is a diagram showing the activation of the contact terminals by the motors when the complementary contactor assemblies are arranged in the first orientation, FIG. 6 shows the high-voltage DC distribution plate of FIG. 4 in left view, FIG. 7 shows the high-voltage DC distribution plate of FIG. 4 when the complementary contactor assemblies are arranged in a second orientation, FIG. 8 is a diagram representing the activation of the contact terminals by the motors when the complementary contactor assemblies are arranged in the second orientation, FIG. 9 is a bottom view of the plate according to FIG. 4, and FIG. 10 is a bottom view of the plate according to FIG. 7.

DESCRIPTION OF THE EMBODIMENTS

The invention is based on the configuration of a high-voltage electrical distribution plate in such a way as to integrate a large number of components into it while allowing adaptation to the requirement of use for distribution and precharging in a high-voltage DC network.

The plate can be used, in particular, to produce a light BPMU, the general block diagram of which is equivalent to that represented in FIG. 1. Such a light BPMU can, for example, be used in a high-voltage storage means (for example a battery, or a supercapacitor) and an electric motor in the case of all-electric propulsion of a small aircraft.

According to an example, the plate hosts the high-voltage DC contactor Kp on the line HV+ in this configuration, the high-voltage DC contactor Kn on the line HV− in this configuration, the high-voltage DC contactor K1 for a precharging line on the power line HV+, the power resistance R1 for current limiting in the precharging line on the line HV+, a current sensor on the lines HV+ and HV−, and control electronics for the contactors Kp, Kn and K1 and for managing the current measurements.

According to the requirements of the application in question, it can be beneficial for the contactors Kp and Kn to be in parallel to independently manage the power lines HV+ and HV−. On the other hand, in other scenarios of application, it may be necessary for the contactors Kp and Kn to be in series to have double isolation of the lines HV+ and HV−. The nature of the charging and the criticality of the function may call for one or the other of these configurations.

According to the invention, the plate is designed such that the main contactors Kp and Kn can be mounted in two orientations on the same plate owing to a carefully chosen geometry and center-to-center distances. Owing to this configuration of the plate, the contactors Kp and Kn can be put either in parallel or in series allowing adaptation to the requirement of use for distribution and precharging in a high-voltage DC network.

FIG. 4 shows an exemplary embodiment of a high-voltage DC electrical distribution plate according to a preferred embodiment of the invention. The FIG. 4 represents a configuration with Kp and Kn in parallel when they are mounted in one of the two orientations provided, this orientation being in right view on FIG. 4 and in left view on FIG. 6. FIG. 5 is a diagram showing the activation of the contact terminals of the contactors Kn and Kp in the parallel configuration.

As illustrated in FIG. 4, the contactors Kp, Kn are incorporated into the plate 40 which acts as a mechanical support for the assembly to make the solution compact and reduce as much as possible the electrical and mechanical interfaces. The motors, auxiliary contacts and beam of the movable part are on one side of the plate, while the chambers of contacts (fixed and movable) are on the other side of the plate.

More specifically, the plate 40 has two opposing major surfaces, 41 and 42. On the first surface 41 are mounted four contact chambers 45a, 46a, 45b and 46b housing the fixed and movable contact terminals of the contactors Kp and Kn. To prevent electric arcs these contact chambers 45a, 46a, 45b and 46b can be, for example, vacuum chambers or oil-filled chambers.

On the second surface 42 of the plate are mounted complementary assemblies of the contactors, 48a, 48b, and other components 52 to 58. According to the example represented in FIG. 4, the other components 52 to 58 include: a current sensor 52, two resistances 54, 55, a precharging contactor 56, and a fuse 58 (visible on FIG. 6).

The complementary assemblies of the contactors, 48a, 48b, include the motors, auxiliary contacts and beam of the movable part of the contactors Kp and Kn. The motors are indicated by 51a and 51b on the drawings. The motor 51a activates Kp.

The components disposed on the second major surface of the plate are arranged in such a way as to leave a free space constituting an attachment area ZF (see on FIG. 6) of the complementary assemblies 48a, 48b of the two contactors. The attachment area ZF is dimensioned to allow the arrangement of the complementary assemblies of the contactors 48a, 48b in two orthogonal orientations. A first orientation in which each of the motors of the complementary contactor assemblies activates the terminals of a respective first sub-assembly of the contact terminal chambers 45a, 46a, 45b and 46b, and a second orientation in which each of the motors of the complementary contactor assemblies activates the terminals of a respective second sub-assembly of the contact terminal chambers 45a, 46a, 45b and 46b, the contact chambers of the first and second sub-assemblies being aligned along respective orthogonal directions.

FIGS. 4, 6 and 9 show the first orientation of the complementary contactor assemblies 48a, 48b. In this first orientation, the motor 51a can open or close the contact terminals disposed in the two contact chambers 45a and 46a which are disposed on the same side of the plate. The sub-assembly of contact chambers in question includes two contact chambers 45a and 46a which are disposed in a first row parallel to the length of the plate.

Similarly, in this first orientation of the complementary contactor assemblies 48a, 48b, the motor 51b can open or close the contact terminals disposed in the two contact chambers 45b and 46b which are disposed on the other side of the plate. The sub-assembly of contact chambers in question includes two contact chambers 45b and 46b which are disposed in a second row parallel to the length of the plate.

This first orientation of the complementary contactor assemblies 48a, 48b allows the motors to control the contactors Kp, Kn in parallel, as represented on FIG. 5.

FIGS. 7 and 10 show the second orientation of the complementary contactor assemblies 48a, 48b. In this second orientation, the motor 51a can open or close the contact terminals disposed in the contact chambers 45a and 45b which are disposed toward the same end of the plate. The sub-assembly of contact chambers in question includes two contact chambers 45a and 45b which are disposed in a third row parallel to the width of the plate.

Similarly, the motor 51b can open or close the contact terminals disposed in the two contact chambers 46a and 46b which are disposed toward the other end of the plate. The sub-assembly of contact chambers in question includes two contact chambers 46a and 46b which are disposed in a fourth row parallel to the width of the plate.

This second orientation of the complementary contactor assemblies 48a, 48b allows the motors to control the contactors Kp, Kn in series, as represented on FIG. 8.

In order to accommodate both orientations of the complementary contactor assemblies 48a, 48b, the other components disposed on the second surface 42 of the plate 40 are apart from one another to leave space for the attachment area ZF. The dimensions of the attachment area ZF are large enough to house the complementary contactor assemblies 48a, 48b, in both the proposed orientations. Moreover, the positioning of the four chambers of contact terminals 45a, 46a, 45b and 46b is in relation with the center-to-center distance of the complementary contactor assemblies 48a, 48b, in particular the center-to-center distance of the motors 51a, 51b, to align the contacts of the two contactors with the corresponding motors of the complementary assemblies of the contactors in the first and the second orientation of the complementary assemblies of the contactors.

Furthermore, the plate 40 includes attachment points 60 suitable for mounting the complementary contactor assemblies 48a, 48b, whether these latters are oriented in the first orientation or oriented in the second orientation. More specifically, provision is made for attachment points 60 suitable for interacting with complementary attachment means 62 on the complementary contactor assemblies 48a, 48b:

- at certain locations on the plate matching the positions of the complementary attachment means 62, when the complementary contactor assemblies 48a, 48b are positioned in the first orientation, and
- at other locations on the plate matching the positions of the complementary attaching means 62, when the complementary contactor assemblies 48a, 48b are positioned in the second orientation.

In the example of FIGS. 4, 6 and 7, the attaching points 60 include smooth holes and screws 61 while the attachment means of the complementary contactor assemblies 48a, 48b include supports 62. Those skilled in the art will understand that other complementary attachment means can be employed on the plate and in the complementary contactor assemblies.

The proposed generic plate constitutes a modular building block adaptable to the requirement of use for distribution and precharging in a high-voltage DC network. It includes contactors integrated on a power plate allowing two arrangement configurations to allow for "series" or "parallel" operation. The mechanical interfaces are identical for both configurations, as shown in FIGS. 4, 6 and 7. The modularity of the solution makes it possible to meet different requirements using the configurations proposed, which allows it to be made generic.

Moreover, the proposed generic plate makes it possible to optimize the mass and volume of the electrical power distribution unit, and allows a reduction in cost.

According to other embodiments of the invention, a plate as described above is incorporated into an electrical power distribution unit, for example an electrical distribution unit mounted between a storage unit and a high-voltage DC bus (HVDC) of an aircraft.

According to other embodiments of the invention, an electrical power distribution network of an aircraft includes a high-voltage DC electrical distribution unit with an integrated plate as described above.

The invention has an application, in particular, in the aerospace industry and the automotive industry, for example in relation with a generator channel, a HVDC battery, a fuel cell, primary distribution, secondary distribution, electric propulsion, hybrid propulsion, etc.

The invention claimed is:

1. A high-voltage DC electrical distribution plate, having two opposing major surfaces, the plate having two integrated electromechanical power contactors, wherein:
on a first of the major surfaces of the plate are disposed chambers of fixed and movable contact terminals of the two electromechanical contactors, while on the second major surface of the plate are disposed complementary assemblies of the two contactors, each complementary contactor assembly including a motor intended to activate the contact terminals of one of the respective contactors,
and in that other components disposed on the second major surface of the plate are arranged in such a way as to leave a free space constituting an area of attachment of the complementary assemblies of the two contactors, the attachment area being dimensioned to allow the arrangement of the complementary assemblies of the contactors in two orthogonal orientations, a first orientation in which each of the motors of the complementary contactor assemblies activates the terminals of a respective first sub-assembly of the contact terminal chambers, and a second orientation in which each of the motors of the complementary contactor assemblies activates the terminals of a respective second sub-assembly of the contact terminal chambers, the contact chambers of the first and second sub-assemblies being aligned along respective orthogonal directions.

2. The high-voltage DC electrical distribution plate as claimed in claim 1, wherein the center-to-center distances of the chambers of the contactors and the center-to-center distances of the complementary assemblies of the contactors are dimensioned to align the contacts of the two contactors with the corresponding motors of the complementary assemblies of the contactors in the first orientation and the second orientation of the complementary assemblies of the contactors.

3. The high-voltage DC electrical distribution plate as claimed in claim 1, wherein it includes attachment points on the second major surface of the plate, the number and the positions of the attachment points being chosen to ensure the attachment of the complementary assemblies of the contactors to the plate, by means of the interaction between these attachment points on the plate and complementary attachment elements provided on the complementary assemblies of the contactors, whether the complementary assemblies of the contactors are oriented in the first configuration or in the second configuration.

4. The high-voltage DC electrical distribution plate as claimed in claim 1, including a precharging function.

5. A high-voltage DC electrical distribution unit mounted between a storage unit and a high-voltage DC bus (HVDC) of an aircraft, said distribution unit including a plate as claimed in claim 1.

6. The electrical distribution unit as claimed in claim 5, wherein the storage unit is a battery or a supercapacitor.

7. An electrical power distribution network of an aircraft including a high-voltage DC electrical distribution unit as claimed in claim 5.

* * * * *